April 2, 1946.   K. M. GAVER   2,397,732
MILDEWPROOFING
Filed June 25, 1943   2 Sheets-Sheet 1

INVENTOR
KENNETH M. GAVER
BY
ATTORNEYS

April 2, 1946.   K. M. GAVER   2,397,732
MILDEWPROOFING
Filed June 25, 1943   2 Sheets—Sheet 2

ORIGINAL STARCH-CATHODE 90 V,
10 MA-PINHOLE 32-14 DISTANCE 3 CM.
TIME 12 HOURS

NA-STARCH-CATHODE 92 V,
12 MA. PINHOLE 32-14
DISTANCE 3 CM. TIME 12 HOURS

INVENTOR
KENNETH M. GAVER
BY
*Toulmin & Toulmin*
ATTORNEYS

Patented Apr. 2, 1946

2,397,732

UNITED STATES PATENT OFFICE 2,397,732

MILDEWPROOFING

Kenneth M. Gaver, Columbus, Ohio, assignor, by mesne assignments, to The Ohio State University Research Foundation, Columbus, Ohio, a corporation of Ohio Application June 25, 1943, Serial No. 492,211

9 Claims. (Cl. 260—209)

This invention relates to metallic starchates or alcoholates and is a continuation-in-part of application Serial No. 357,995, filed September 23, 1940.

The present invention more particularly deals with metallic starchates which are particularly adapted for and valuable in mildew-proofing fabrics and other products having a base of cellulose or derivatives thereof.

As has been set forth in copending application Serial No. 357,995 to which reference has been made above, when starch is reacted with alcohol soluble hydroxides (such as the alkali metal hydroxides of sodium, potassium, rubidium and caesium) under certain conditions there is produced a metallic starchate or alcoholate wherein the alkali metal is attached through an oxygen atom to a carbon atom in the complex α-glycopyranose residue (the structure commonly considered as the building unit of starch). The starchate product formed is an α-glucopyranose compound. The structural formula of the unit which is polymerized to form the complex starchate is illustrated as follows, wherein M represents a metal

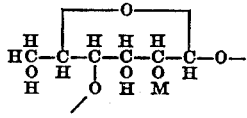

Cereal starches are composed of at least two distinct but chemically similar substances, the readily soluble branch chain components and the less soluble straight chain components of which the branch chain components constitute 80% or more of the starch granule. Root starches consist of approximately 100% amylopectin or branched chain components. In the light of present knowledge, the amylose molecule consists of from 250 to 500 anhydro-α-glucopyranose units polymerized together in a straight chain configuration. It has been the general practice heretofore to represent the unit of the starch molecule as

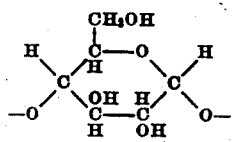

In view, however, of the known chemical and physical properties of starch and from the results of my studies, it is now apparent that the most probable structure formula of the building unit of the complex molecule of starch more correctly consists of a 2,3 anhydro-α-glucopyranose unit although the possibility of a 2,6 anhydro-α-glucopyranose unit is not excluded. The 2,3 anhydro-α-glucopyranose unit may be expressed structurally as follows:

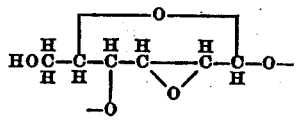

Justification for this formula is shown by the following reactions:

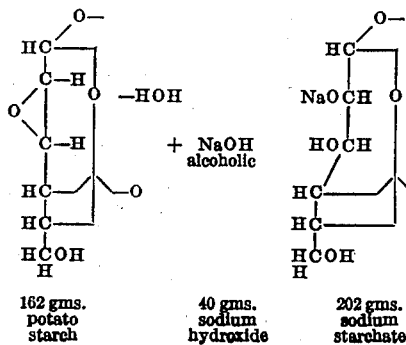 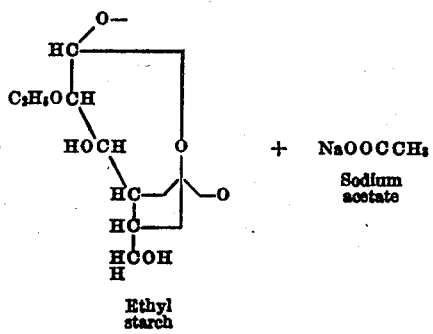

162 gms. potato starch 40 gms. sodium hydroxide 202 gms. sodium starchate

+ C₂H₅OOCCH₃ ⟶

Colloidally soluble in water, not filterable

Ethyl starch

+ NaOOCCH₃

Sodium acetate

Sodium hydroxide adds quantitatively to starch, Soluble in water with hydrolysis. Filterable.

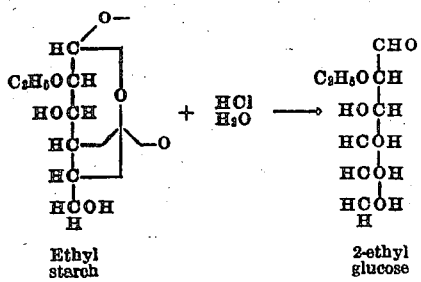

Ethyl starch → 2-ethyl glucose

Reduced Fehling's solution—
Forms hydrazones
Does not form osazone
α-benzyl phenyl-hydrazone derivative melts at 157 degrees C. (uncorrected), 161 degrees C. (corrected), while the corresponding derivative of glucose melts at 145 degrees C. (uncorrected), 149 degrees C. (corrected).

Further proof was obtained by subjecting the 2-ethyl glucose to Wohl's degradation:

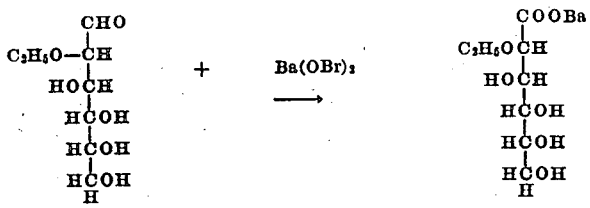

Non-reducing ethyl ester of arabonic acid.

Further justification of the 2,3 anhydro-α glucopyranose unit is indicated in that when this unit is oxidized with $HIO_4$, the starch oxidizes and hydrolyzes and the carbon chain is broken at the position 3. The various products isolated in good yields being oxalic acid, erythronic acid and a ring compound to which the following formula was assigned:

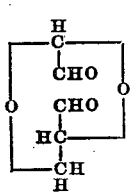

Which was further oxidized to the ring acid.

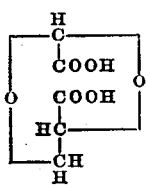

Which was isolated as its strontium salt.

Further when starch is treated with HBr under certain conditions there is formed a compound which has been isolated and characterized as ω-bromomethyl furfural

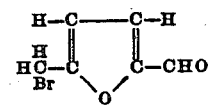

The mechanism of the formation of this compound being explainable on the basis of the 2,3 ethylene oxide ring and its many transformations.

Similarly the presence of the 2,3 ethylene oxide structure is indicated since starch reacts with ethyl magnesium bromide to form ethyl magnesium starch bromide with one mole of ether

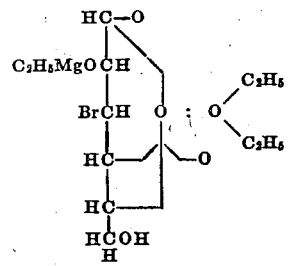

Likewise when sodium starchate (alcoholate) is dissolved in water, a limpid solution results which may be neutralized, the starch recovered by precipitation with alcohol filtered, washed, dried and ground. This product is entirely different from the original starch in that it is water soluble, yielding a filterable, non-reducing, faintly cloudy solution and called starch hydrol, the subject of a companion application. A solution of starch in aqueous sodium hydroxide of identical concentrations results in a gel which when treated in identical manner yields a rubbery water-insoluble product resembling somewhat the original starch. If, however, the gel resulting from solution of the starch in aqueous sodium hydroxide is allowed to stand at room temperature for a period of two or more months a thin limpid solution results which is similar in properties to the solution resulting from dissolution of sodium starchate in water. Heating of the aqueous alkaline solutions causes the well-known alkaline degradation.

Similar to the above, when starch is methylated, the following reactions take place:

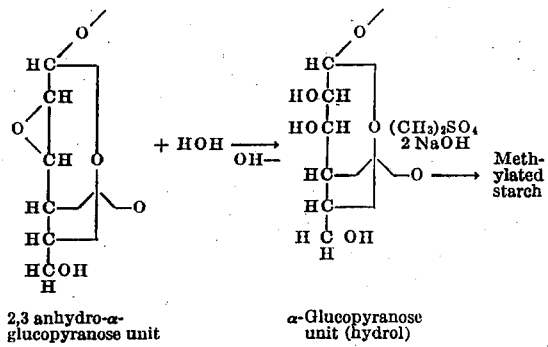

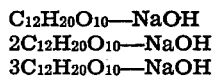
2,3 anhydro-α-glucopyranose unit

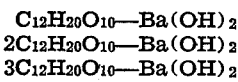
α-Glucopyranose unit (hydrol)

The methyl group may enter in either position 2,3 or 6 or any combination of positions.

It has been known, heretofore, that starch may be modified by treatment with aqueous solutions of alkalies, alkaline salts, alkaline earth hydroxides and other hydroxides to produce starch products wherein a certain amount of alkali, alkaline salt, alkaline earth hydroxide or other hydroxide is adsorbed on the oxygen bridges within the building units, i. e. on the 2,3 ethylene oxide ring or on the 1,5 pyranose ring replacing the co-ordinated water in an equimolecular proportion. It has long been known that water as such was a natural constituent of the starch molecule and thermal decomposition data indicates that this water is present as co-ordinated water. The generally accepted position of this co-ordination being on the oxygen bridge of the 1,5 pyranose ring. Treatment in aqueous media with various metallic hydroxides is conducive to ion exchange whereby the metallic hydroxide replaces the water of co-ordination. Various co-ordinated compounds have been reported as having compositions represented by the following formulas $C_{12}H_{20}O_{10}$—NaOH      $C_{12}H_{20}O_{10}$—Ba(OH)$_2$
$2C_{12}H_{20}O_{10}$—NaOH    $2C_{12}H_{20}O_{10}$—Ba(OH)$_2$
$3C_{12}H_{20}O_{10}$—NaOH    $3C_{12}H_{20}O_{10}$—Ba(OH)$_2$ Similar compounds of barium, calcium, strontium, magnesium, zinc, aluminum, copper, iron, lead either alone or in combination with other metals have been reported. The inability of the various investigators to make these compounds undergo the Williamson ether reaction is proof of their co-ordinated nature whereas the alkali metal starchate (alcoholate) that we are describing readily undergoes the Williamson ether reaction.

Obviously, in all these cases, the product formed was not a compound in the strictest sense but rather co-ordinated complexes of poorly defined nature. By the present invention I have discovered that where starch is reacted, preferably by refluxing with an alcoholic solution of alkali hydroxide (i. e. containing 8–14% NaOH or its equivalent) for a sufficient time and under controlled conditions an alkali starchate (alcoholate) compound is formed which contains 15.5 to 16.5% NaOH or its equivalent in the case of cereal starches (i. e. rice) and from 19.3 to 19.8% NaOH or its equivalent in the case of root starches (i. e. potato), the theoretical value being 19.8% for straight chain polysaccharide. The figures experimentally obtained as given above agree closely with the theoretical values when corrected for the branch chain fraction in the respective starches.

The alkali starchate (alcoholate) produced by my method when tested by titration and chemical reactions definitely prove that the starch derivative formed is not an addition or co-ordinated compound but a true alcoholate of starch. This is further borne out in that the starchate (alcoholate), particularly the sodium or potassium starchate produced has been found to be adapted for use as a starting compound in making other metallic derivatives, ethers, esters and other typical compounds using non-aqueous reaction medium.

PREPARATION OF SODIUM STARCHATE

My method of preparing alkali metal starchates from starch is illustrated in the drawings in Figure 1 by the flow chart. As typical examples of the process the following are given:

EXAMPLE I 80 grams of NaOH are dissolved in a liter of ethyl alcohol and the alcohol insoluble portion consisting of mostly alkali carbonates is filtered out and the filtered alcoholic NaOH is mixed with dry starch in the proportion of about 1 liter of alcoholic NaOH to 100 grams of starch. The mixture is then refluxed at the boiling temperature of the alcoholic solution for a period of two to four hours with vigorous stirring so as to maintain the temperature uniform throughout the mixture and avoid decomposition of the starch before the reaction with the sodium hydroxide is completed.

Thereafter, the refluxed mixture is filtered by suitable means, such as with the use of vacuum, centrifugal, or pressure filters. The filtered product is then washed free of NaOH by alcohol. The quantity of alcohol used in the washing depends upon the efficiency of the washings. Ordinarily a liter of alcohol is used per 100 grams of filter cake (dry basis) and where the filter cake is thicker, this amount may be used to wash 450 to 500 grams of the product. The starchate compound formed is then washed with ether to remove the alcohol in which there may be used approximately 100 cc. per 450 grams of the starchate. Alcohol present in cake tends to catalyze the transition of the metal from the starchate to alkali metal carbonate. Washing with ether eliminates this danger and vacuum drying also aids this.

The product is then dried at a temperature below 78 degrees C., preferably vacuum drying being used. The final starchate product is then screened and packed in air-tight containers.

In the foregoing example, the process described is that employed in the chemical laboratory for making small batches of my sodium starchate compound. Larger batches of the product may be made by the use of larger amounts of the ingredients and with appropriate apparatus. Other alcohols may be substituted for ethyl alcohol where their boiling points are sufficiently high to yield a starchate product. Methyl alcohol cannot be used in this process because it yields a product having only 6.4% NaOH instead of 19.8% under the same conditions employing ethyl alcohol. Normal propyl alcohol can be used but it is too costly at the present time. Isopropyl alcohol does not dissolve sufficient NaOH and therefore cannot be used. A saturated solution of NaOH in normal butyl alcohol can be used but the alcohol is difficult to recover.

In preparing the alcoholic NaOH, the strength of NaOH may vary between 2.0 to 3.5 normal (80–140 grams/liter) without appreciably affecting the product or its analysis.

The time of heating may vary from 2 to 24 hours without appreciably affecting the product or its analysis and the reaction temperature may vary from 78 degrees to 98 degrees C. with 98 degrees C. being the maximum temperature permissible without decomposition.

As a typical example of a method of making sodium starchate industrially, the following is given:

EXAMPLE II 417 pounds of flake caustic soda or caustic potash is dissolved in approximately 500 gallons of industrial ethyl alcohol. The mixture is allowed to stand to precipitate the carbonate impurities present which are removed by filtration.

Approximately 500 pounds of dry starch (i. e. potato starch) is introduced into the alcoholic NaOH solution and the whole mixture refluxed for two hours below 98 degrees C. while being vigorously stirred. The product is then filtered and washed free of alkali with ethyl alcohol and the filter product consisting of sodium starchate is dried in a vacuum oven under 78 degrees C. equipped with means for preventing entry of carbon dioxide and means for recovery of the alcohol.

The dry product is then ground, screened and packed in substantially air-tight containers. This process gives a yield of about 94.4% to 99.9% in case of potato starches and 79% to 82% in case of rice starch, both yields being practically theoretical when based on straight chain polysaccharide content.

The sodium starchate compound formed by treating starch with NaOH, as described in Examples I and II, is readily soluble in water with spontaneous hydrolysis, whereas the original starch is insoluble in water.

Other starches may be used in preparing my alkali starchate compound, such as those derived from corn, wheat, potatoes, sago, arrowroot, cassava, etc. and their derivatives, the dextrins and synthetic carbohydrate products.

Test results indicate that the starch is made up of from 250 to 500 -2,3 anhydro-α-gluco-pyranose units $(C_6H_8O_4.H_2O)_{20-30}$ and a series of these molecules are oriented similar to superimposed sheets and held together by co-ordinated water molecules between the oxygen bridge of the lactone and the oxygen of the ethylene oxide ring. This structural arrangement accounts for the addition compound of starch having the reported empirical formula $C_{12}H_{20}O_{10}$ NaOH in that in this addition product one-half of the water of co-ordination is removed and NaOH takes the place of this water and itself forms a co-ordinating molecule splitting the superimposed sheets into separate sheets. This also explains the failure to react starch addition compounds, such as $C_{12}H_{20}O_{10}NaOH$, in organic synthesis which is one of the uses of my sodium starchate compound made according to this invention.

In order to show that the sodium starchate compounds which I have discovered is an alcoholate distinguishable from NaOH-starch addition products of the prior art, X-ray studies were made of different starch substances, as illustrated in Figures 2 to 7.

Figure 2 is a reproduction of an X-ray photograph of the raw rice starch as used in my process. Figure 3 is a similar X-ray photograph showing the results after extracting raw starch with alcohol. Figure 4 is a similar photograph after the extraction by alcohol has been made the second time. Figure 5 is a photograph of the original starch after being washed with 1% alcoholic NaOH solution. Figure 6 is an X-ray photograph of the starch after it has been refluxed with 5% alcoholic NaOH solution. Figure 7 is an X-ray photograph of the sodium starchate made according to this invention containing 16% NaOH.

Figures 8 and 9 correspond to Figures 2 and 7, respectively.

As will be noted, the alcoholic extraction and washing with 1% alcoholic NaOH have no effect on the starch since those structures being responsible for the rings having the diameters 0.95, 1.65, 1.90, 2.22, 2.55, 3.03 and 3.50 cms. have not been altered. In the case of starch which was refluxed with 5% alcoholic NaOH, the lines having the diameters 0.95 and 2.22 have disappeared indicating that the protein may have been removed. No compound is indicated since no new lines appeared.

Figure 7:
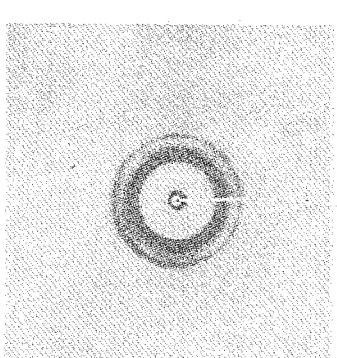
Figure 8:
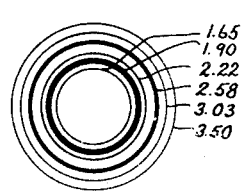
Figure 8 is a drawing illustrating the concentric ring structure which appears when a raw particle of starch is X-ray photographed.
Figure 9:
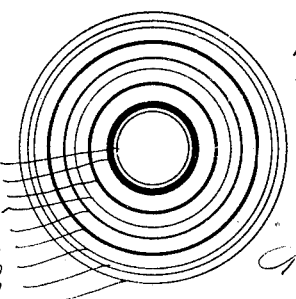
Figure 9 is a similar drawing showing the new ring structure which appears when the same starch is reacted with a predetermined amount of sodium hydroxide to produce sodium starchate in accordance with my discovery.

In Figure 7 and as illustrated by the corresponding Figure 9, however, where the starchate contains 16% NaOH, it will be observed that certain lines have been expanded, namely, 1.65 to 1.70, 2.55 to 2.58 and 3.03 to 3.17, indicating that the structure has been expanded in one dimension and also new lines appear as at 4.30, 4.80, 5.09, 5.40, 6.50 and 6.95. This X-ray photograph substantiates that my new sodium starch product is a compound.

Figure 1:
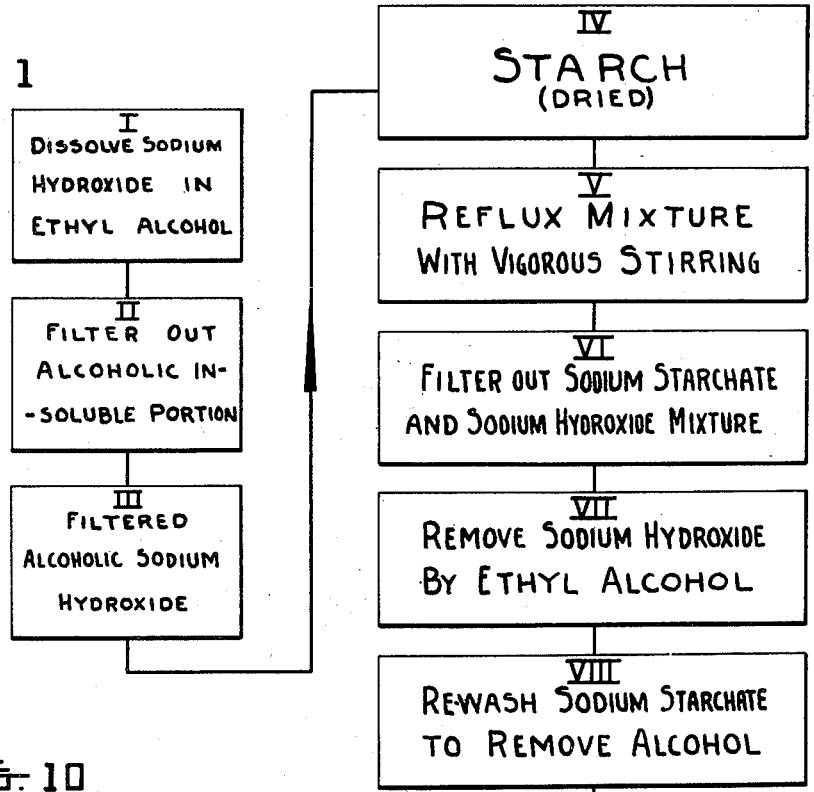
Figure 10:
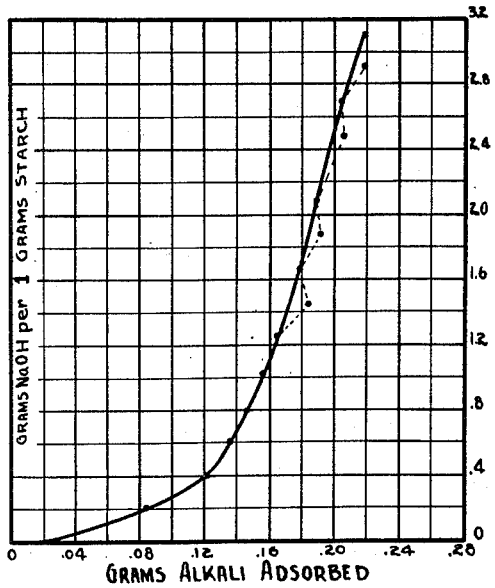
Figure 2:
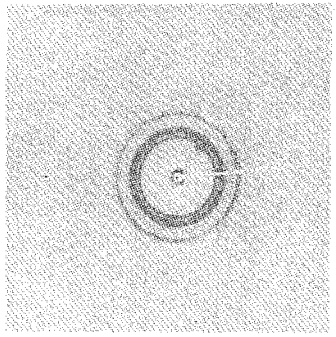
Figure 3:
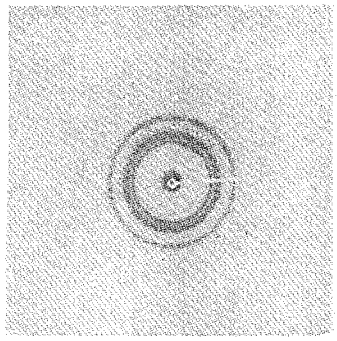
Figure 4:
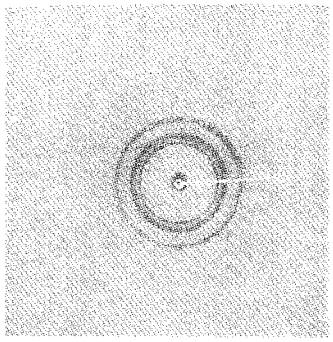
Figure 5:
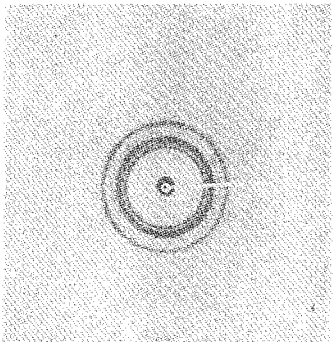
Figure 6:
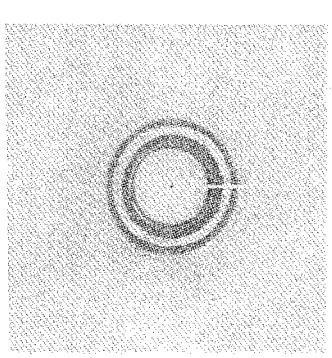

A series of tests were made to show what concentration of NaOH is required to bring about the reaction of the NaOH with the starch to produce the sodium starchate of my invention. The results of these tests are indicated in the following tables:

Table I (Fig. 10)

A series of 2 gram samples of rice starch (equivalent to 1.8 grams of starch) were dried for one hour at 130 degrees C. to remove the moisture, and it was then treated with 25 cc. of a solution of NaOH and ethyl alcohol and the mixture allowed to react at room temperature for 24 hours.

| Sample No. | Gms. NaOH original | Gms. NaOH reacted (per gm.) | % NaOH |
|---|---|---|---|
| 1 | 0.000 |  | 0.00 |
| 2 | 0.209 | 0.0844 | 7.8 |
| 3 | 0.418 | 0.121 | 10.7 |
| 4 | 0.627 | 0.135 | 11.5 |
| 5 | 0.836 | 0.144 | 12.3 |
| 6 | 1.045 | 0.155 | 13.0 |
| 7 | 1.254 | 0.164 | 13.8 |
| 8 | 1.463 | 0.181 | 15.3 |
| 9 | 1.672 | 0.177 | --- |
| 10 | 1.881 | 0.189 | 16.00 |
| 11 | 2.090 | 0.185 | 15.9 |
| 12 | 2.300 | 0.154 |  |
| 13 | 2.508 | 0.206 | 17.3 |
| 14 | 2.717 | 0.207 | 17.3 |
| 15 | 2.936 | 0.216 | 17.1 |
| 16 | 3.135 | 0.215 | 17.1 |
| 17 | 5.340 | 1.211 | Decomp. |

Table II

In this experiment a series of rice and potato starch samples were treated with alcoholic sodium hydroxide, refluxed over an open flame for one hour, filtered hot and washed 20 times with 95% ethyl alcohol until the washings were neutral to phenolphthalein indicator. The samples contained approximately 90% starch.

formed whereby NaOH is merely adsorbed on the particles of starch.

One of the most outstanding characteristics of the sodium starchate made according to my in-

|  | Sample No. | | | | | | |
|---|---|---|---|---|---|---|---|
|  | 1 | 2 | 3 | 4 | 5 | 6 | 7 |
| Weight of starch_____gms__ | 100 | 100 | 100 | 100 | 100 | 100 | 100 |
| Treatment of starch_____ | Air dry | Air dry | Air dry | Air dry | Air dry | Air dry | Bone dry |
| cc. of alcohol 95%_____cc__ | 0.0 | 1,500 | 1,500 | 1,500 | 1,500 | 1,500 | 1,000 |
| NaOH in alcohol_____gms__ | 0.0 | 0.0 | 6.3 | 13.7 | 24.1 | 34.3 | 81.4 |
| Refluxed_____hours__ | 0.0 | 1 | 1 | 1 | 1 | 1 | 2 |
| Weight of product_____ | 100 | 99 | 102 | 112 | 119 | 122 | 118 |
| NaOH in filtrate_____ | 0.0 | 0.0 | 0.2 | 1.9 | 5.9 | 10.0 | 50.8 |
| NaOH in product_____ | 0.0 | 0.0 | 5.9 | 10.0 | 12.1 | 14.0 | 16.8 |
| Percent NaOH_____ | 0.0 | 0.0 | 5.7 | 8.8 | 10.1 | 11.4 | 14.24 |
| Percent NaOH dry basis_____ | 0.0 | 0.0 |  |  |  |  | 16.8 |
| Relative viscosity_____ | 1.04 | 1.07 | 1.07 | 1.00 | 1.02 | 1.02 |  |
| Specific rotation_____ | 203.6 | 199.5 | 112.8 | 98.6 | 120.0 | 115.8 |  |
| Surface tension_____ | 55.7 | 53.7 | 52.1 | 52.9 | 53.4 | 58.8 |  |
| I₂ color_____ | Blue | Blue | Purple | Purple | Reddish | Reddish | Red |

|  | Sample No. | | | | | | |
|---|---|---|---|---|---|---|---|
|  | 8 | 9 | 10 | 11 | 12 | 13 | 14 |
| Weight of starch_____gms__ | 100 | 100 | 100 | 100 | 100 | 100 | 100 |
| Treatment of starch_____ | Bone dry | Bone dry | Air dry | Air dried ³ | Air dried ⁴ | Air dry | Air dry |
| cc. of alcohol 95 percent___cc__ | 1,000 | 1,000 | 1,000 | 1,000 | 1,000 | 1,000 | 1,000 |
| NaOH in alcohol_____gms__ | 76.90 | 76.10 | 85.8 | 99.6 | 77.0 | 136.5 | 113.9 |
| Refluxed_____hours__ | 2 | 2 | 2 | 2 | 2 | 2 | 2 |
| Weight of product_____ | 114 | 118 | 129 | 108 | 129 | 129 | 135 |
| NaOH in filtrate_____ | 46.82 | 44.12 | 66.9 | 83.8 | 38.4 | 91.96 | 82.66 |
| NaOH in product_____ | 16.7 | 17.0 | 19.01 | 6.9 | 19.91 | 20.82 | 18.90 |
| Percent NaOH_____ | 14.64 | 14.26 | 14.74 | 6.40 | 15.44 | 16.14 | 14.00 |
| Percent NaOH dry basis_____ | 16.27 | 15.20 | 16.9 |  | 16.2 | 19.10 | 16.4 |
| Relative viscosity_____ |  |  |  |  |  |  |  |
| Specific rotation_____ |  |  |  |  |  |  |  |
| Surface tension_____ |  |  |  |  |  |  |  |
| I₂ color_____ | Red | Red | Red | Red | Red | Red | Red |

|  | Sample No. | | | | | | |
|---|---|---|---|---|---|---|---|
|  | 15 | 16 | 17 | 18 | ¹ 19 | ² 20 | 21 |
| Weight of starch_____gms__ | 400 | 400 | 400 | 400 | 100 | 100 | 32 |
| Treatment of starch_____ | Air dry | Air dry | Air dry | Air dry | Air dry | Air dry | (⁶) |
| cc. of alcohol 95%_____cc__ | 4,000 | 4,000 | 4,000 | 4,000 | 1,000 | 1,000 | 700 |
| NaOH in alcohol_____gms__ | 358.6 | 358.6 | 360.9 | 412.7 | 94.2 | 95.6 | 68.9 |
| Refluxed_____hours__ | 3 | 6 | 24 | 6 | 2 | 2 | 2 |
| Weight of product_____ | 492 | 525 | 530 | 525 | 128 | 135 | 39 |
| NaOH in filtrate_____ | 239.0 | 226.9 | 231.7 | 277.3 | 60.7 | 61.7 | 48.0 |
| NaOH in product_____ | 73.50 | 79.59 | 82.36 | 76.86 | 20.2 | 26.89 | 7.1 |
| Percent NaOH_____ | 14.94 | 15.14 | 15.54 | 14.64 | 15.8 | 19.42 | 18.33 |
| Percent NaOH dry basis_____ |  |  |  | 16.60 | 19.75 | ⁵ 20.60 | 18.33 |
| Relative viscosity_____ |  |  |  |  |  |  |  |
| Specific rotation_____ |  |  |  |  |  |  |  |
| Surface tension_____ |  |  |  |  |  |  |  |
| I₂ color_____ | Red | Red | Red | Red |  | Red |  |

Average NaOH in reaction product in case of rice starch, 16.3% (calculated 16.04%).
Average NaOH in reaction product in case of potato starch, 19.75 (calculated 19.8%).
Average NaOH in reaction product in case of potato dextrin, 19.80 (calculated 19.8%).
Average NaOH in reaction product in case of dextran, 18.33% (calculated 18.22%).

¹ Potato starch.
² Potato dextrin.
³ Methyl alcohol.
⁴ Butyl alcohol.
⁵ Less Na₂CO₃ 19.80%.
⁶ Alcohol washed.

As indicated in the graph in Figure 10, a definite break in the reaction curve corresponding to 16.0% NaOH in rice starch which when corrected for the branch chain fraction gives a theoretical value of 19.8%. The hump in the curve corresponds to a reaction product of one NaOH to one anhydro-α-glucopyranose unit. The values of 17% indicate the presence of Na₂CO₃ impurity.

When the amount of NaOH is increased above that indicated in Sample No. 16, decomposition of the product is brought about, as shown by a break in the pH value. This indicates that when a certain proportion of NaOH and starch is treated together under certain conditions a reaction between the NaOH and starch is effected which is different from the intermediate product vention is that it possesses a very low viscosity as compared with a simple solution of starch in NaOH. Addition NaOH starch products do not show this low viscosity. Further, it is found that the surface tension of water is lower when my sodium starchate product is introduced. The iodine coloration also changes from blue to red upon the formation of sodium starchate by my process and returns to blue on neutralization. The filterability of the aqueous solutions of sodium starchate is also unexpected with the increased quantities of combined sodium hydroxide. This is in direct contrast to conventional solutions of starch in alkali.

REACTIONS OF METALLIC STARCHATES

The metal compounds of starch made as described with alkali metal hydroxides undergo the Williamson ether reaction to form derivative products. The following typical examples are illustrative. In each case the sodium starchate used was made in accordance with the method of Example I:

EXAMPLE III

(a) Ethyl starch

Sodium starchate and ethyl bromide mixed in proportionate stoichiometric weight amounts calculated to form ethyl starch when reacted, were refluxed for 12 hours, filtered, dissolved in water, coagulated with ethyl alcohol and again filtered. The coagulum formed crystalline particles when heated with butyl alcohol and analyzed as ethyl starch.

Sodium starchate was refluxed in ethyl acetate for 3 hours, filtered and purified as above to produce ethyl starch.

(b) Benzyl starch

Sodium starchate was refluxed for 6 hours with benzyl chloride in petroleum ether (B. P. 65–110 degrees C.) filtered and purified as above to produce benzyl starch.

Sodium starchate was heated at 100 degrees C. with benzyl acetate for three hours, filtered, and purified as above forming benzyl starch.

(c) Isoamyl starch

Sodium starchate was refluxed for 3 hours with isoamyl bromide, filtered and purified as above producing isoamyl starch.

(d) Butyl starch

Sodium starchate was refluxed 6 hours with butyl chloride, filtered and purified as above to produce butyl starch.

(e) Hydroxy ethyl starch

Sodium starchate was refluxed for about 10 minutes at 100 degrees C. with chlorhydrin in pyridine and purified twice as above forming hydroxy ethyl starch.

(f) Starch diacetate

Sodium starchate was treated with acetyl chloride in pyridine and filtered. The product was then dissolved in acetone and precipitated by water producing starch diacetate by analysis.

(g) Starch monoacetate

Sodium starchate treated with acetic anhydride as above gave starch monoacetate by analysis.

(h) Phthalimide starch

Sodium starchate also reacts with phthalimide forming a phthalimide starch derivative.

(i) Starch dibenzoate

Sodium starchate treated with benzoyl chloride produced starch dibenzoate by analysis.

(j) o-Chloro benzyl starch

Sodium starchate treated with o-chloro benzyl starch and reacting as in the above examples produced a product which upon purification and analysis contained 8% chlorine equivalent to 65% yield of ortho-chloro-benzyl-ether of starch. Prolonged heating above 100 degrees C. yielded a product in which more chlorine was reacted with the sodium starchate which product was water insoluble and formed no colloidal solution upon heating as does starch and derivatives thereof such as ethyl starch.

OTHER METALLIC STARCHATES

Various metallic starches may be synthesized starting with the sodium starchate compound of Example I by appropriate treatments. A typical method consists of the following:

EXAMPLE IV

Dissolve the metal salt in ethyl alcohol or similar solvent and add sodium starchate (Ex. I) in calculated stoichiometric proportionate amount to produce the substituted metal starch reaction product. The mixture is warmed and vigorously stirred until the reaction is completed; thereafter, the product is filtered, washed with ethyl alcohol and finally with ether, then dried and screened.

Different salts when reacted with my sodium starchate as described give the following final reaction products:

(a) Cobalt chloride in alcohol reacted with sodium starchate as outlined above gives cobalt chloro starch. When the product is oven dried at from 70 to 75 degrees C. it is blue in color, whereas, if air-dried, it is pink.

(b) Cobalt chloride is dissolved in ammonium hydroxide and reacted with sodium starchate and precipitated with alcohol. When air-dried cobalt amino hydroxy starch is formed. Oven drying forms cobalt hydroxy starch.

(c) Nickel chloride in alcohol reacted with sodium starchate likewise forms nickel chloro starch. Some of this material in alcohol when treated with ammonium hydroxide, filtered and air-dried produced nickel amino hydroxy starch. When oven dried nickel hydroxy starch is formed.

(d) Zinc chloride in alcohol reacted with sodium starchate forms zinc chloro starch.

(e) Copper chloride in alcohol was reacted with sodium-starchate and produced copper chloro starch as the reaction product. Further treatment of copper chloro starch in alcohol with ammonium hydroxide formed copper amino chloro starch.

(f) An alcoholic solution of basic lead acetate when reacted with sodium starchate formed lead hydroxy starch.

(g) Sulfur monochloride in high boiling petroleum ether was reacted with sodium starchate to form dithio chloro starch.

(h) A solution of uranium nitrate in alcohol was decolorized completely with sodium starchate formed from potato starch to form uranium nitrate starch.

(i) Sodium starchate and ether solution of ferric chloride when reacted produced ferric chloro starch.

(j) Sodium starchate and ether solution of aluminum chloride reacted to form aluminum chloro starch.

(k) Sodium starchate and petroleum ether solution of arsenic trichloride reacted producing arsenic chloro starch.

(l) Sodium starchate and petroleum ether solution of antimony trichloride react producing antimony chloro starch.

(m) Sodium starchate and petroleum ether solution of phosphorous oxychloride reacted to produce phosphorous oxychlorostarch.

(n) Sodium starchate and petroleum ether solution of thionyl chloride reacted forms sulfur oxychloro starch.

(o) Sodium starchate and alcoholic solution of calcium chloride react producing calcium chloro starch.

(p) Sodium starchate and alcoholic solution of magnesium chloride react forming magnesium chloro starch.

(q) Sodium starchate and alcoholic solution of barium bromide reacted produce barium bromo starch.

An unpredictable number of other metallic starchate compounds can be produced by reacting an alkali metal or equivalent starchate compound with a salt of the metal of which a starch derivative is desired, as described in Example IV. When my sodium starchate product is chemically reacted with the following compounds there are formed by double decomposition other starch derivative products as follows:

Aluminum—
    chloride forms alumino chloro starch
    bromide forms alumino bromo starch
    iodide forms alumino iodo starch
    nitrate forms alumino nitrate starch
Antimony—
    chloride forms antimony chloro starch
    iodide forms antimony iodo starch
Arsenic—
    chloride forms arsenic chloro starch
    fluoride forms arsenic fluoro starch
    iodide forms arsenic iodo starch
    sulfide forms arsenic thio starch
Barium—
    bromide forms barium bromo starch
    perchlorate forms barium perchlorate starch
    thiocyanate forms barium thiocyanate starch
Beryllium—
    bromide forms beryllium bromo starch
    chloride forms beryllium chloro starch
    fluoride forms beryllium fluoro starch
    iodide forms beryllium iodo starch
Bismuth chloride forms bismuth chloro starch
Boron bromide forms boron bromo starch
Cadmium—
    bromide forms cadmium bromo starch
    iodide forms cadmium iodo starch
    nitrate forms cadmium nitrate starch
    sulfate forms cadmium sodium sulfate starch
Calcium—
    bromide forms calcium bromo starch
    chloride forms calcium chloro starch
    chlorate forms calcium chlorate starch
    perchlorate forms calcium perchlorate starch
    chromate forms calcium chromate starch
    iodide forms calcium iodo starch
    nitrate forms calcium nitrate starch
    thiocyanate forms calcium thiocyanate starch
Cerium—
    bromide forms cerium bromo starch
    iodide forms cerium iodo starch
    nitrate forms cerium nitrate starch
Chromium—
    bromide forms chromium bromo starch
    chloride forms chromium chloro starch
    fluoride forms chromium fluoro starch
    nitrate forms chromium nitrate starch
    sulfate forms chromium sodium sulfate starch Cobalt—
    chloride forms cobalt chloro starch
    bromide forms cobalt bromo starch
    chlorate forms cobalt chlorate starch
    perchlorate forms cobalt perchlorate starch
    iodide forms cobalt iodo starch
    nitrate forms cobalt nitrate starch
    sulfate forms cobalt sodium sulfate starch
    sulfide forms cobalt sulfo starch
Columbium—
    chloride forms columbium chloro starch
    fluoride forms columbium fluoro starch
Copper—
    bromide forms copper bromo starch
    chloride forms copper chloro starch
    fluoride forms copper fluoro starch
    nitrate forms copper nitrate starch
Dysprosium—
    chloride forms dysprosium chloro starch
    bromide forms dysprosium bromo starch
    iodide forms dysprosium iodo starch
    bromate forms dysprosium bromate starch
Erbium—
    chloride forms erbium chloro starch
    nitrate forms erbium nitrate starch
Gallium sulfate forms gallium sodium sulfate starch
Germanium—
    bromide forms germanium bromo starch
    chloride forms germanium chloro starch
Gold—
    bromide forms gold bromo starch
    chloride forms gold chloro starch
    cyanide forms gold cyano starch
Indium—
    perchlorate forms indium perchlorate starch
    nitrate forms indium nitrate starch
Iridium bromide forms iridium bromo starch
Iron—
    bromide forms iron bromo starch
    perchlorate forms iron perchlorate starch
    chloride forms iron chloro starch
    iodide forms iron iodo starch
    nitrate forms iron nitrate starch
    sulfate forms iron sodium sulfate starch
    thiocyanate forms iron thiocyanate starch
Lanthanum—
    bromide forms lanthanum bromo starch
    chloride forms lanthanum chloro starch
    nitrate forms lanthanum nitrate starch
Lead—
    chlorate forms lead chlorate starch
    basic acetate forms lead aceto starch
Magnesium—
    bromide forms magnesium bromo starch
    chlorate forms magnesium chlorate starch
    chloride forms magnesium chloro starch
    iodide forms magnesium iodo starch
    nitrate forms magnesium nitrate starch
    sulfate forms magnesium sodium sulfate starch
    thiosulfate forms magnesium thiosulfate starch
Manganese—
    chloride forms manganese chloro starch
    nitrate forms manganese nitrate starch
    sulfate forms manganese sulfate starch
    sulfide forms manganese sulfo starch
    thiocyanate forms manganese thiocyanate starch
Mercury—
    ammonium iodide forms a mercury starch compound
    potassium cyanide forms a mercury starch compound Molybdenum chloride forms molybdenum chloro starch
Neodymium chloride forms neodymium chloro starch
Nickel—
    bromide forms nickel bromo starch
    chloride forms nickel chloro starch
    perchlorate forms nickel perchlorate starch
    iodide forms nickel iodo starch
    nitrate forms nickel nitrate starch
    sulfate forms nickel sulfate starch
Osmium chloride forms osmium chloro starch
Phosphorous—
    fluoride gives phosphorous fluoro starch
    sulfide forms phosphorous sulfo starch
    thiocyanate forms phosphorous thiocyanate starch
Platinum—
    bromide forms platinum bromo starch
    chloride forms platinum chloro starch
    sulfate forms platinum sodium sulfate starch
Praseodymium chloride forms praseodymium chloro starch
Radium—
    bromide forms radium bromo starch
    chloride forms radium chloro starch
Rhodium chloride forms rhodium chloro starch
Ruthenium chloride forms ruthenium chloro starch
Samarium chloride forms samarium chloro starch
Selenium oxyfluoride forms selenium oxyfluoro starch
Silicon fluoride forms silicon fluoro starch
Silver perchlorate forms silver perchlorate starch
Strontium—
    bromide forms strontium bromo starch
    chlorate forms strontium chlorate starch
    chloride forms strontium chloro starch
    sulfide forms strontium sulfo starch
Tantalum—
    bromide forms tantalum bromo starch
    chloride forms tantalum chloro starch
Tellurium chloride forms tellurium chloro starch
Terbium chloride forms terbium chloro starch
Thallium—
    bromide forms thallium bromo starch
    chloride forms thallium chloro starch
    iodide forms thallium iodo starch
Thorium—
    chloride forms thorium chloro starch
    nitrate forms thorium nitrate starch
Tin—
    chloride forms tin chloro starch
    iodide forms tin iodo starch
Titanium—
    bromide forms titanium bromo starch
    chloride forms titanium chloro starch
Tungsten—
    bromide forms tungsten bromo starch
    chloride forms tungsten chloro starch
Uranium—
    chloride forms uranium chloro starch
    nitrate forms uranium nitrate starch
Uranyl—
    chloride forms uranyl chloro starch
    nitrate forms uranyl nitrate starch
Vanadium—
    bromide forms vanadium bromo starch
    chloride forms vanadium chloro starch
    fluoride forms vanadium fluoro starch
Vanadyl sulfate forms vanadyl sodium sulfate starch
Yttrium—
    bromide forms yttrium bromo starch
    chloride forms yttrium chloro starch
    iodide forms yttrium iodo starch
    nitrate forms yttrium nitrate starch
Zinc—
    bromide forms zinc bromo starch
    chloride forms zinc chloro starch
    iodide forms zinc iodo starch
    nitrate forms zinc nitrate starch
    thiocyanate forms zinc thiocyanate starch
Zirconium—
    chloride forms zirconium chloro starch
    bromide forms zirconium bromo starch
Zirconyl—
    chloride forms zirconyl chloro starch
    iodide forms zirconyl iodo starch In view of the above reaction products which are formed when my sodium starchate compound is treated, it is obvious that many other possible combinations may occur. For example, the copper-silver group of metals all co-ordinate ammonia to form the amino complexes. Further, the halogen compounds have a replaceable halogen which may be substituted by organic acid radicals, hydroxyls and many other groups. Also the remaining —OH groups of the starch may be replaced by organic groups as acetyl, benzyl, benzoyl, etc. In this connection, many salts are soluble in ether and the reactions may be carried out in a manner similar to that indicated for alcohol. Other solvents may be used to good advantage. In some cases the reactions can be carried out using water as the solvent but the drying of the product becomes an important factor.

The metallic starchates or alcoholates of this invention as well as derivatives thereof are adapted for use in numerous industrial operations. The particular use and degree of satisfaction will vary with the particular compound and the use which is made of it.

One of the fields wherein the products of the present invention find use is as mildewproofing agents and there shall now be described a manner in which certain of these products may be thus employed and the results obtained therewith.

Fabrics exposed to warm, humid conditions have a tendency to undergo fiber deterioration with or without discoloration. These phenomena are usually attributed to the growth of micro-organisms, especially molds or fungi. Although many compounds and techniques have been used to impregnate these fabrics to prevent this damage, failures have been much more common than successes when the so-treated fabrics are exposed to unfavorable conditions.

Mildew is caused by micro-organism growth of which there are many capable of attacking fabrics. The sources of infection arise from soil, air and anything else contacted from point of production to area of use. The molds are disseminated or propagated by means of tiny spores which under favorable conditions grow into more mold and thereby spread the mildew. The growth of the mold depends largely on temperature, moisture and the available food supply. In general, the development of fungi may be impeded by controlling any of these factors. The controlling of temperature and humidity is generally impractical and fungi must be controlled largely by regulation of the food supply. The most suitable method for controlling this factor lies in the incorporation of fungi inhibitors in the fabric sizing or finishing materials.

There are certain specific requirements which a mildewproofing agent must meet and among these are the following:

(a) The agent must be fairly soluble in water or other suitable solvent at the temperatures used in mixing.

(b) After being applied to the fabric the agent must be only slightly soluble in water and must remain unchanged and not readily removable during weathering.

(c) The color of the fabric must not be altered unfavorably.

(d) The agent must be free from objectionable odors.

(e) The agent must not make the fabric more inflammable than before application.

(f) The "feel" or "hand" of the fabric must not be altered.

(g) The agent must be safe for handling.

(h) The agent must have no detrimental effects on the parts of the machinery with which is comes in contact.

(i) Dying and finishing properties of the yarn must not be affected adversely.

(j) The agent must be of low cost and easily obtainable.

(k) Tendering of the yarn must not be produced either by direct action of the mildewproofing agent or its decomposition in the presence of heat or light.

Mildewproofing agents are usually applied by running the cloth or fabric through a bath which contains the agent in solution in either organic or inorganic solvents or in emulsions. After the fabric has been immersed, it is passed between rollers to remove the excess solution.

A number of derivatives of alkali metal starchate are of especial value as mildewproofing agents, and among these copper chloro starch, mercuri chloro starch and copper aceto starch prove particularly valuable.

These products may be applied to the cloth or fabric to be mildewproofed either by immersing the finished fabric as hereinbefore mentioned or by admixing them with the size applied to the fabric in finishing, and in either case they produce satisfactory results. Although these products are water dispersible (form colloidal solutions), they are not easily leached out of fabric impregnated with them. This appears to be due primarily to adsorption or the effect of secondary valences in the starch molecule, because the fabric will remove all of the starch derivative from solution, leaving behind only water.

An interesting and valuable property of these products is that they do not adversely influence the tensile strength of material on which they are applied as mildewproofing agents. For example, a sample of cotton duck having a tensile strength of 93 when sized with 2.5% of copper chloro starch showed a tensile strength of 99.5 and a similar sample sized with 5% copper chloro starch showed a tensile strength of 99.5. After these treated samples had been exposed to *Chaetomium globosum* for fifteen days the untreated sample had been completely destroyed by mildew, the sample sized with 2½% copper chloro starch had a tensile strength of 92, and the sample treated with 5% copper chloro starch had a tensile strength of 94. In other words, the treated samples had a greater tensile strength than the untreated sample even after 15 days exposure to mildew.

The following are typical examples of the results obtained on various types of cloth in their untreated form and when treated with mildewproofing agents according to the present invention and then exposed to mildew producing organisms or conditions:

Test "A"

Bags of cotton duck treated with 2% copper chloro starchate and others made of untreated cotton duck were filled with sand and placed on the soil in a greenhouse. At the end of 28 days there was no evidence of mildew on the bags made from treated cloth, while at the end of 17 days the bags made of untreated cloth had burst.

Test "B"

A similar test was made with the same material and under the same conditions excepting that at the end of 7 days the bags were wetted with water. At the end of 28 days the bags made from treated cloth remained in good condition, while at the end of 17 days the bags made from untreated cloth had burst and were too rotten to handle.

Test "C"

A similar test was made with the same type of material excepting that at the end of 7 days the bags were wetted with a synthetic sea water. At the end of 21 days the bags made from treated cloth were again wetted with synthetic sea water and at the end of 28 days they were in sound condition. The bags made from untreated material burst and were too rotten to handle at the end of 17 days.

The cloth from which the bags were made, before treating, had a tensile strength of 159 and after treatment but before exposure to mildew had a tensile strength of 164. The treated cloth after exposure had a tensile strength of 163. In every instance the untreated material after exposure was too rotten to be tested for tensile strength.

Similar tests to those hereinbefore reported have been made with a variety of materials. For example, so-called balloon cloth, both coated and uncoated, has been treated according to and with the materials of this invention. Likewise, silk, rayon and nylon fabrics have been treated successfully according to the method and with the products of this invention. Fibrillated belting, cotton webbing, shroud lines used in parachutes, and the like, and other articles of silk, rayon, nylon and cotton have been exposed to mildew producing organisms and results of the order indicated in Tests "A" to "C" above referred to have been obtained.

The percentage of copper in the cloth following treatment of the cloth and leaching to remove the excess has varied from about 1% to about 5%, but satisfactory results are invariably obtained with quantities not in excess of about 2½% and frequently with considerably less.

As has been noted hereinbefore, a number of other derivatives of alkali metal starchates may be used successfully for mildewproofing in addition to those specifically mentioned herein. Aluminum and zinc derivatives are mildew retardants but not mildewproofing agents.

It will be understood that while there have been described herein certain particular embodiments of this invention, it is not intended to have the invention limited to or circumscribed by the specific details of procedure, proportions, or materials herein described in view of the fact that this invention is susceptible to modifications according to individual preference and conditions without departing from the spirit of this disclosure and the scope of the appended claims.

I claim:

1. As a new article of manufacture, a mildewproofing agent comprising copper chloro starchate.

2. As a new article of manufacture, a mildewproofing agent comprising copper aceto starchate.

3. As a new article of manufacture, a mildewproofing agent comprising mercuri chloro starchate.

4. As a new article of manufacture a mildewproofing agent comprising a non-alkali metal starchate in which the starchate anion is chemically bound to a salt of said non-alkali metal.

5. As a new article of manufacture, a mildew proofing agent comprising a copper starchate in which the starchate anion is chemically bound to a copper salt.

6. As a new article of manufacture, a mildew proofing agent comprising a copper starchate in which the starchate anion is chemically bound to a copper halide.

7. As a new article of manufacture, a mildew proofing agent comprising a non-alkali metal starchate in which the starchate anion is chemically bound to a halide of said non-alkali metal.

8. As a new article of manufacture, a mildew proofing agent comprising a mercury starchate in which the starchate anion is chemically bound to a mercury salt.

9. As a new article of manufacture, a mildew proofing agent comprising a mercury starchate in which the starchate anion is chemically bound to a mercury halide.

KENNETH M. GAVER.

Disclaimer 2,397,732.—*Kenneth M. Gaver*, Columbus, Ohio, MILDEWPROOFING. Patent dated Apr. 2, 1946. Disclaimer filed Mar. 3, 1949, by the assignee, *The Ohio State University Research Foundation;* the inventor, consenting.

Hereby enters this disclaimer to that part of the specification which is in the following words, to wit:

"(*f*) *Starch diacetate.* Sodium starchate was treated with acetyl chloride in pyridine and filtered. The product was then dissolved in acetone and precipitated by water producing starch diacetate by analysis." on page 6, lines 50 through 55.

"(*i*) *Starch dibenzoate.* Sodium starchate treated with benzoyl chloride produced starch dibenzoate by analysis." on page 6, column 1, lines 66 through 69.

[*Official Gazette April 5, 1949.*]